United States Patent [19]

Girard

[11] Patent Number: 4,503,590
[45] Date of Patent: Mar. 12, 1985

[54] CABLE CONTROL APPARATUS

[76] Inventor: Leon E. Girard, 516 E. 14th St., Ames, Iowa 50015

[21] Appl. No.: 477,538

[22] Filed: Mar. 21, 1983

[51] Int. Cl.³ .............................................. F16G 11/00
[52] U.S. Cl. ........................................ 24/114.5; 3/12; 3/12.1; 24/505; 188/196 B; 294/86.4
[58] Field of Search .................. 254/201, 391; 49/347; 3/12, 12.1, 12.3; 294/86 R; 188/196 B, 196 V; 24/68 R, 114.5, 115 R, 115 F, 115 H, 115 G, 116 R, 136 R, 134 KA, 265 R, 296, 489, 502, 505, 513, 517

[56] References Cited

U.S. PATENT DOCUMENTS

| 137,320 | 4/1873 | Pusey | 24/115 R X |
| 866,144 | 9/1907 | Kobert | 24/115 R |
| 1,278,641 | 9/1918 | Hancox | 24/115 R |
| 1,499,477 | 7/1924 | Reilly | 24/114.5 |
| 1,554,845 | 9/1925 | Gizzi | 24/115 R X |
| 3,335,468 | 8/1967 | Harley | 24/116 R X |
| 4,027,989 | 6/1977 | Pierce | 24/116 R X |
| 4,167,044 | 9/1979 | Girard | |

FOREIGN PATENT DOCUMENTS

| Re. 53098 | 9/1945 | France | 74/501 |
| 1676 | of 1898 | United Kingdom | 24/115 R |

Primary Examiner—William E. Lyddane
Assistant Examiner—James R. Brittain
Attorney, Agent, or Firm—Henderson & Sturm; Henderson & Sturm

[57] ABSTRACT

A cable control apparatus for selectively locking a cable in a plurality of axially disposed positions. The apparatus includes a movable cable having a first end connected to a biasing unit for biasing the cable away from the apparatus and a second end upon which a force may be exerted, a control unit affixed to the cable, a first track unit for receiving the control unit when urging the control unit away from the biasing unit a second track unit for receiving the control unit when returning the control unit to an at rest position, a plurality of third track units for receiving the control unit when locking said control unit in other than said at rest position, and a plurality of fourth track units for receiving the control unit when moving the control unit from the first track unit to the second track unit, with at least one of the fourth track units being positioned between at least two of the third track units. In addition, a cable alignment unit may be provided to maintain the cable, when at rest, substantially disposed between the first and second track units.

8 Claims, 8 Drawing Figures

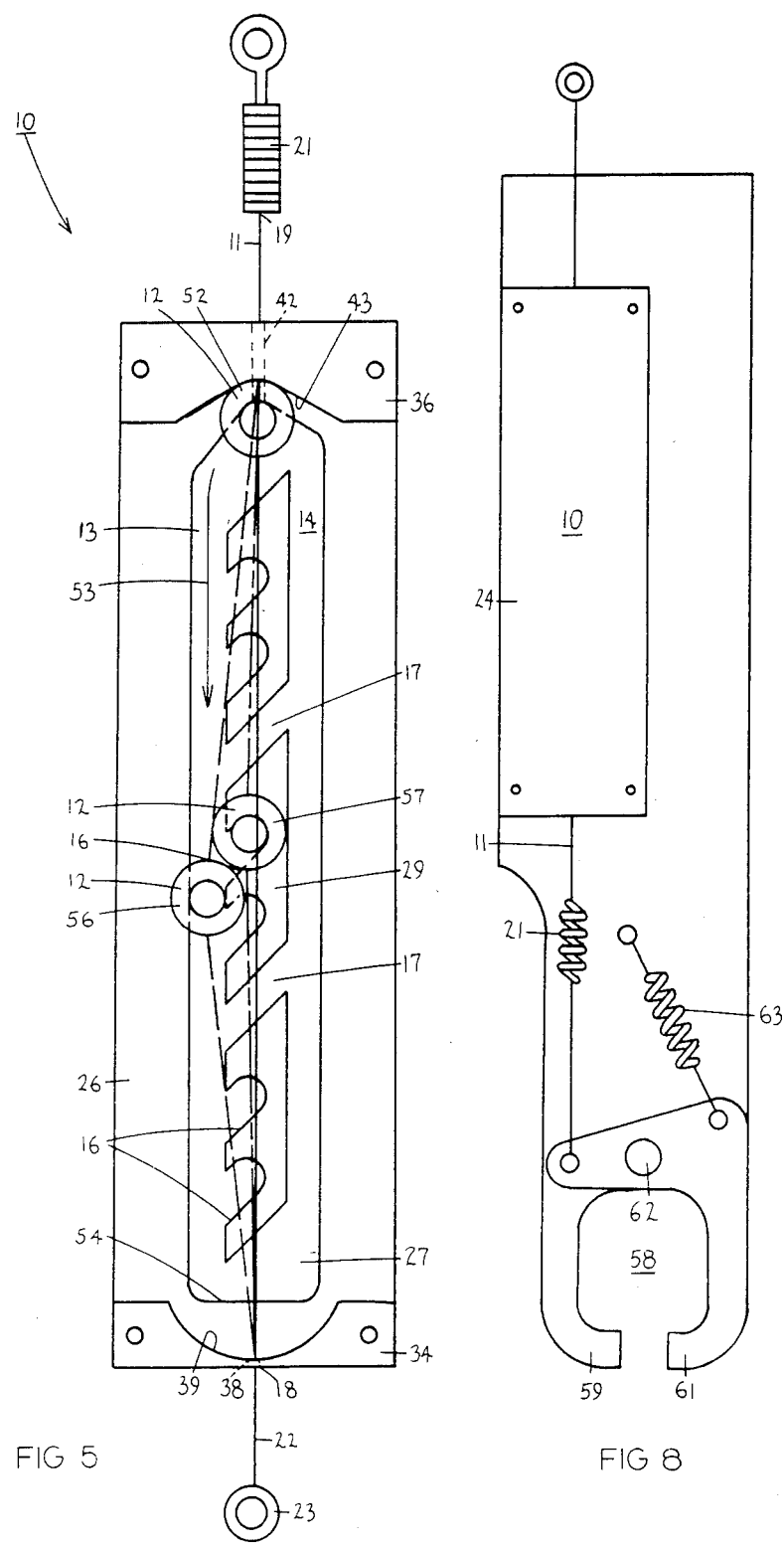

CABLE CONTROL APPARATUS

TECHNICAL FIELD

This invention relates generally to cable control apparatus and more particularly to such apparatus as used to selectively prevent movement of a cable in a specified direction.

BACKGROUND ART

Various structures may be found in the prior art that are used to control axial movement of a cable, and to lock a cable in a particular desired position. Typically, many such structures operate in an environment where one end of the cable will be connected to a biasing force.

Such cable control mechanisms have particular use in constructing prosthetic aids, though they are not limited to such apparatus. Generally, these prior art structures operate to selectively lock a cable in one of a plurality of axially disposed positions in opposition to a biasing force.

These structures usually make use of one of two mechanisms to release the cable and return it to its at rest position. In some prior art structures, the cable must be moved to a position furthest from the at rest position before the cable may be returned to the at rest position. In other structures, the operator may avoid having to move the cable to this distal position, but very slow and precise movements are required in order to return the cable to its at rest position.

DISCLOSURE OF INVENTION

The instant invention provides an inexpensive, easily manufactured cable control apparatus that operates to selectively lock a cable in any of a plurality of axially disposed positions in opposition to a biasing force, wherein the cable can be returned to an at rest position without the need to fully extend the cable and without the need for slow and precise movements as previously required.

These advantages are obtained here by the provision of a cable control apparatus having a movable cable, a control unit, a first track unit, a second track unit, a plurality of third track units, a plurality of fourth track units, and a cable alignment unit.

The various track units are formed in one or more members as troughs or cavities therein. The first track unit operates to receive the control unit when urging the control unit away from the biasing means. The second track unit operates to receive the control unit when returning the control unit to its at rest position.

The plurality of third track units are for receiving the control means when locking the control unit in a position other than the at rest position. Finally, the plurality of fourth track units operate to receive the control unit when moving the control unit from the first track unit to the second track unit.

In one embodiment of the invention, these track units are formed by disposing a plurality of angularly shaped blocks within a primary cavity. A first longitudinally disposed track formed between the cavity wall and the blocks constitutes the first track unit. The remaining longitudinal track formed between the opposing cavity wall and the blocks constitutes the second track unit.

The third track units are formed by angularly disposing slots within the blocks themselves, and the fourth track units may be formed by disposing pathways between the blocks that connect the first track unit with the second track unit.

In use, the cable, and hence the control unit that connects thereto, may be moved along the first track unit by exerting a force on the cable in opposition to the biasing force connected to one end of the cable. Movement along the first track unit, though occurring along a path substantially parallel to the at rest axis of the cable, also occurs somewhat laterally thereof. Therefore, the biasing force tends to urge the control unit laterally inward as well as towards the biasing force.

With the force on the cable relieved, the control unit will tend to move along the first track unit towards the biasing force. This movement will continue until the control unit either engages a third track unit or a fourth track unit.

If it engages a third track unit, the control unit will become lodged within the slot formed in the block, thereby locking the control unit, and hence the cable, in this axial position. If the control unit engages instead a fourth track unit, the control unit will move from the first track unit to the second track unit and return to its at rest position.

Therefore, the cable may be locked in a variety of axial positions by simply maneuvering the control unit to an appropriate lock position as represented by one of the plurality of third track units. In the same manner, the control unit may be returned to its at rest position by maneuvering the control unit to one of the many paths represented by the fourth track units that connect the first track unit with the second track unit.

BRIEF DESCRIPTION OF THE DRAWINGS

These and other attributes of the invention will become more obvious upon a thorough review of the following description of the best mode for carrying out the invention, particularly when reviewed in conjunction with the drawings, wherein:

FIG. 5 is a top plan view of the first member of the invention that depicts various positions of the control unit therein;

FIG. 8 is a reduced top plan view of the invention as connected to a pair of biased opposing jaws.

BEST MODE FOR CARRYING OUT THE INVENTION

Figure 1:
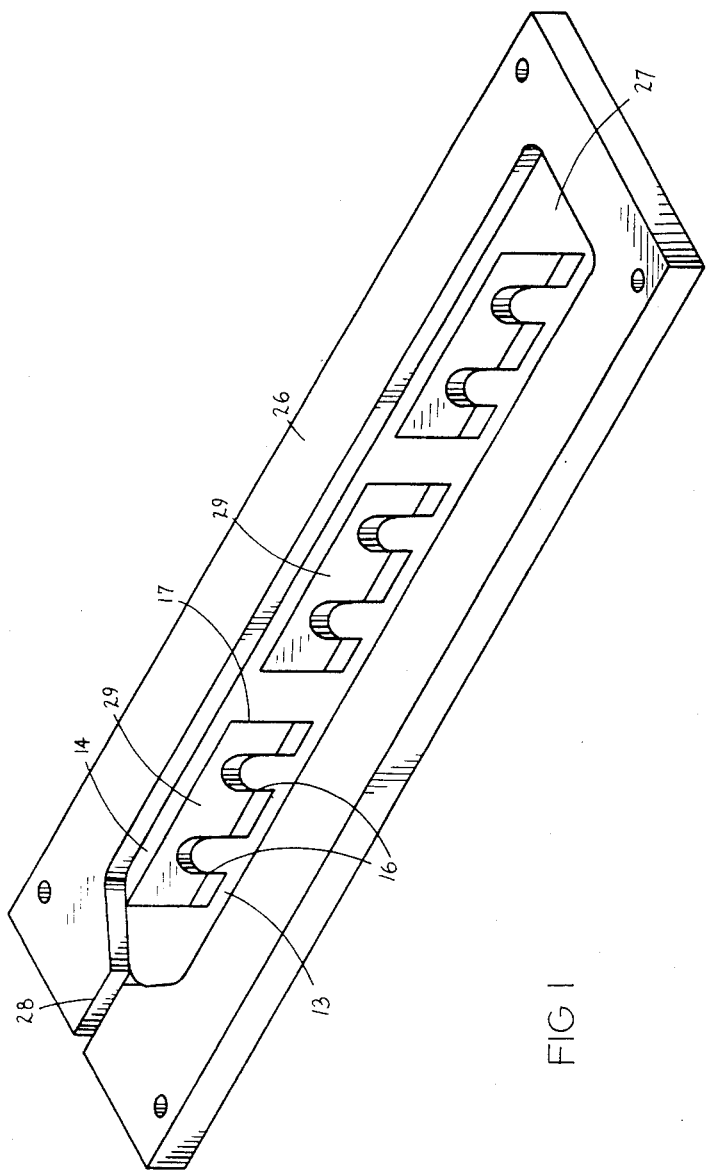
FIG. 1 is a perspective view of the first member of the invention.

Referring now to the drawings, and in particular to FIG. 5, the apparatus may be seen as depicted generally by the numeral 10. The apparatus (10) includes generally a movable cable (11), a control unit (12), a first track unit (13), a second track unit (14), a plurality of third track units (16), a plurality of fourth track units (17) and a cable alignment unit (18). These units will now be described in greater detail in seriatim fashion.

With continued reference to FIG. 5, the movable cable (11) has a first end (19) connected to a first biasing unit (21) that urges the first end (19) of the cable (11) away from the apparatus (10). The second end (22) of the cable (11) includes some means for being selectively urged away from the first biasing unit (21), in this case a ring (23) that may be selectively engaged by an operator's finger (not shown). The cable (11) may be comprised of any materials suitable for the particular application in question.

With respect to FIG. 1, it will be observed that the various track units (13, 14, 16 and 17) are formed within a first and second member (26 and 24).

The first member (26) has a cavity (27) formed longitudinally therein, with one end of the cavity (27) having a slot (28) connected thereto. A plurality of blocks (29) are disposed within the cavity (27), which blocks have longitudinal walls that are substantially parallel to the longitudinal walls of the cavity (27), but the lateral walls of which are disposed at a 45° angle with respect to the lateral axis of the cavity (27).

Figure 2:
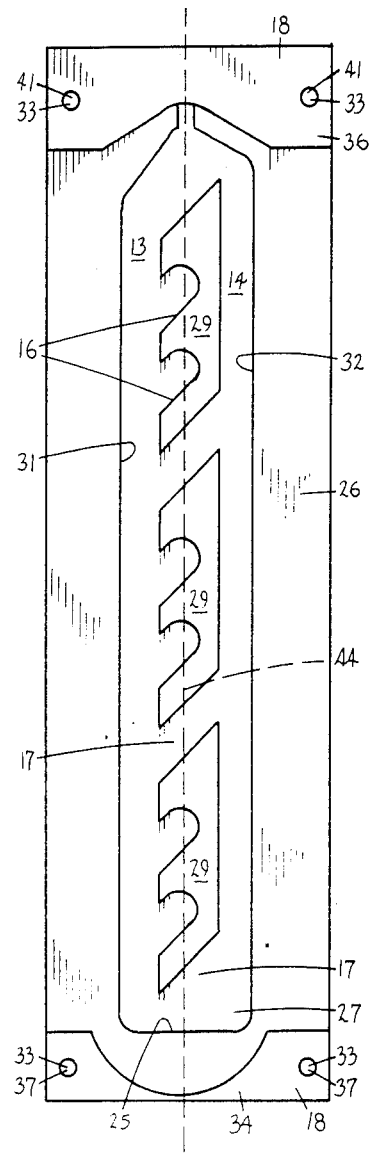
FIG. 2 is a top plan view of the first member of the invention.

With reference to FIG. 2, the first track unit (13) is formed between one sidewall (31) of the cavity (27) and the blocks (29) disposed within the cavity (27). The second track unit (14) is formed between the opposing sidewall (32) of the cavity (27) and the blocks (29).

The third track units (16) are formed by angularly disposed slots formed within the blocks (29). In the embodiment depicted, each block (29) includes two such slots. Also to be noted in the embodiment depicted, the slots are formed substantially parallel with the angularly disposed lateral walls of the blocks (29). The significance of this will be made clear below.

The fourth track unit (17) may be formed of the pathways disposed between the blocks (29) and between the blocks (29) and the cavity endwall (25) that serve to connect the first track unit (13) with the second track unit (14). Again, it should be noted that in this embodiment the fourth track units (17) are generally disposed at an angle relative to the lateral axis of the cavity (27).

Figure 3:
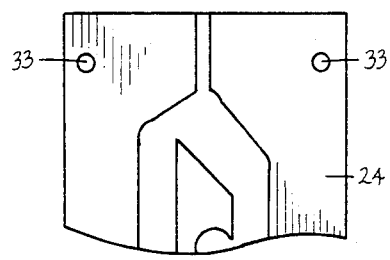
FIG. 3 is a detail bottom plan view of the second member of the invention.

In general, the second and first members (24 and 26) are simply mirror images of one another, as indicated by the partial representation of the second member (24) in FIG. 3. Therefore, the description of the first member (26) provided above may serve as the description of the second member (24) as well. Both the second and first members (24 and 26) also include a hole (33) disposed through each member at each corner thereof to facilitate attachment of the second unit (24) to the first member (26).

With continued reference to FIG. 2, the cable alignment unit (18) may be comprised of two spacer plates (34 and 36). The first spacer plate (34) includes two holes (37) disposed therethrough to coincide with the holes (33) disposed through the second and first members (24 and 26). The first spacer plate (34) also includes another hole (38) disposed therethrough for receiving the cable (not shown in FIG. 2, but depicted in FIG. 5). The spacer plate (34) also includes a curved notch (39) for receiving the control unit (12).

The second spacer plate (36) also includes two holes (41) disposed therethrough to coincide with the holes (33) disposed through the second and first members (24 and 26). In addition, the second spacer plate (36) also includes a hole (42) disposed therethrough for receiving a cable (not shown in FIG. 2, but depicted in FIG. 5). The second spacer plate (36) also includes an arcuate surface (43) for accomodating the control unit (12).

It should be noted that the cable receiving holes (38 and 42) of the two spacer plates (34 and 36) are disposed such that a taut cable disposed therethrough will be substantially centrally disposed over the blocks (29) as represented by the dashed line (44) depicted in FIG. 2. The importance of this alignment feature will become more clear below.

Figure 4:
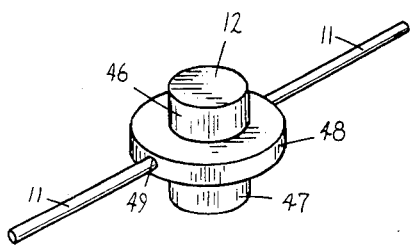
FIG. 4 is an enlarged perspective view of the control unit.

Referring now to FIG. 4, the control unit (12) comprises an second and first track engaging member (46 and 47) as well as a centrally disposed plate (48). The second and first track engaging members (46 and 47) have a circular cross-section and are of a size to move freely without significant lateral movement within the first, second, third and fourth track units (13, 14, 16 and 17). Furthermore, the length of the second and first track engaging members (46 and 47) is substantially equal to the depth of the cavities (27) formed in the second and first members (24 and 26).

The plate (48) of the control member (12) is of a thickness substantially equal to the thickness of the spacer plates (34 and 36), and has a circumference wider than that of the first, second, third or fourth track units (13, 14, 16 and 17).

Finally, it will be observed that the plate (48) of the control unit (12) includes a hole (49) disposed therethrough for snugly receiving a cable (11). It is intended that the control unit (12) be affixed to the cable (11). This attachment may be achieved through friction or by any other appropriate holding means.

Figure 6:
FIG. 6 is a side elevational view of the invention.
Figure 7:
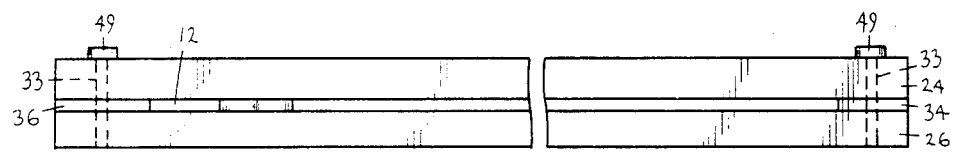
FIG. 7 is a front elevational view of the invention.

Referring now to FIGS. 6 and 7, it may be seen that the second member (24) may be disposed atop the first member (26) with the two spacer plates (34 and 36) sandwiched therebetween. A plurality of posts (49) may then be disposed through the holes (33, 37 and 41) that are disposed through the second and first members (24 and 26) and through the two spacer plates (34 and 36) in order to attach these members together. So configured, it will be appreciated that the control unit (12) may move along the various tracks provided, and cannot escape the boundaries of the tracks.

Referring now to FIG. 5, operation of the apparatus (10) will now be described. For purposes of clarity, the second member (24) has been removed to clearly depict the blocks (29) and the tracks (13, 14, 16 and 17). It should be understood, however, that in use, the second member (24) should be in place for this particular embodiment to operate satisfactorily.

The control unit (12), as attached to the cable (11), is shown at rest by the numeral 52. In this position, the first biasing unit (21) urges the cable (11) and the control unit (12) towards itself, but the boundaries of the cavity (27) restrict the control unit (12) from moving any further towards the first biasing unit (21).

If an operator grasps the ring (23) provided, and pulls on the cable (11) against the force of the first biasing unit (21), the control unit (12) will move along the first track unit (13) in the direction indicated by the arrow identified by the numeral 53. Movement in this direction will continue until the operator either releases the cable (11) or until the control unit (12) contacts the far distal end (54) of the cavity (27).

For purposes of illustration, presume that the operator ceases to exert a force upon the cable (11) when the control unit (12) reaches the position denoted by the numeral 56. At this point, it will be appreciated that the first biasing unit (21) will be urging the control unit (12) to move in a lateral, as well as a longitudinal direction. it will be further appreciated that the control unit (12) must now engage the third track unit (16) disposed in the block (29). The control unit (12) will continue to move along this third track unit (16) until the control unit (12) reaches the end of the slot.

At this point, the control unit (12) will be held within the slot by the first biasing unit (21), and the cable (11) will be held in this relative axial position. This locked position is represented in the drawing by the numeral 57.

It may now be appreciated that the control unit (12) can be returned to the at rest position (52) by again exerting a force on the cable (11) until the control unit (12) can engage one of the fourth track units (17). The control unit (12) will then be pulled along the fourth track unit (17) until the control unit (12) engages the second track unit (14). At this point, the control unit (12) will move along the second track unit (14) in the direction of the first biasing unit (21) until the control unit (12) returns to its at rest position (52).

Referring now to FIG. 8, the apparatus (10) is depicted in combination with a pair of biased opposing jaws (58). One of the jaws (59) remains fixed, and the remaining jaw (61) rotates about a journalled member (62). The second jaw (61) is biased towards an open position by a second biasing unit (63). One end of the second jaw (61) then connects to the first biasing unit (21) and hence to the cable (11) of the apparatus (10).

It will be appreciated that by exerting a force on the cable (11) and moving the cable away from the jaws (58), the jaws (58) may be incrementally urged towards one another and hence, towards a closed position. These jaws (58) may be placed in a variety of locked positions by simply placing the control unit (12) in a variety of different slots as represented by the third track units (16). Similarly, the jaws may be returned to their fully opened position by allowing the control unit (12) to pass through the nearest fourth track unit (17) such that the control unit (12) may return to its at rest position.

It will be appreciated that the cable control apparatus (10) of this invention may be utilized in a great variety of applications. It should further be realized that a number of varying embodiments would be obvious to those skilled in the art that make use of the particular inventive concept disclosed. For instance, any number of blocks (29) could be provided, depending upon the needs of the operator. Furthermore, the blocks (29) themselves could include any number of slots as provided by the third track units (16), again depending upon the particular application of the operator. Similarly, any number of fourth track units (17) could be provided, depending upon the degree of convenience required by the operator.

Other embodiments could be provided whereby the track units (13, 14, 16 and 17) are formed of a single member, or of more than two members. Further, other angles or differing angles as between the third and fourth track units (16 and 17) and the first and second track units (13 and 14) could be provided, and control units (12) having differing configurations could be utilized to equal effect.

Obviously, many modifications and variations of the present invention are possible in light of the above teachings. It is therefore to be understood, that, within the scope of the appended claims, the invention may be practised otherwise than as specifically described.

I claim:

1. A cable control apparatus for selectively locking a cable in a plurality of positions, said positions being located substantially axial to said cable, and said apparatus comprising:
   (a) a movable cable having a first end that connects to a biasing means for biasing said first end away from said apparatus, and a second end;
   (b) control means affixed to said cable; and
   (c) a member having:
      (i) first track means formed therein for receiving said control means when said control means is urged away from said biasing means;
      (ii) second track means formed therein for receiving said control means when said control means is returned to an at rest position;
      (iii) a plurality of third track means formed therein that connect with said first track means but not with said second track means for receiving said control means when said control means is locked in other than said at rest position; and
      (iv) a plurality of fourth track means formed therein that connect said first track means with said second track means for receiving said control means when moving said control means from said first track means to said second track means, at least one of said fourth track means being positioned between at least two of said third track means.

2. The apparatus of claim 1 and further including cable alignment means for maintaining said movable cable when at rest substantially disposed between said first and second track means.

3. The apparatus of claim 1 wherein at least part of said first, second, third and fourth track means are formed in a first member.

4. The apparatus of claim 3 wherein said first, second, third and fourth track means are formed in said first member and in a second member disposed substantially proximal to said first member.

5. The apparatus of claim 4 and further including at least one plate disposed between said first and second members to space said members slightly apart from one another.

6. The apparatus of claim 3 wherein said first member includes at least one cavity formed therein, said cavity forming at least part of said first, second, third and fourth track means.

7. The apparatus of claim 6 and further including a plurality of blocks disposed within said cavity, at least some of said fourth track means being formed between at least some of said blocks, and at least some of said third track means being formed of slots disposed within at least some of said blocks.

8. The apparatus of claim 7 wherein said first and second track means are disposed substantially parallel with respect to one another and wherein at least some of said third and fourth track means are disposed at other than a 90° angle with respect to said first and second track means.

* * * * *